Sept. 1, 1953 S. D. ROBINS 2,650,695
BELT CONVEYER DRIVE
Filed Feb. 11, 1950 6 Sheets-Sheet 2
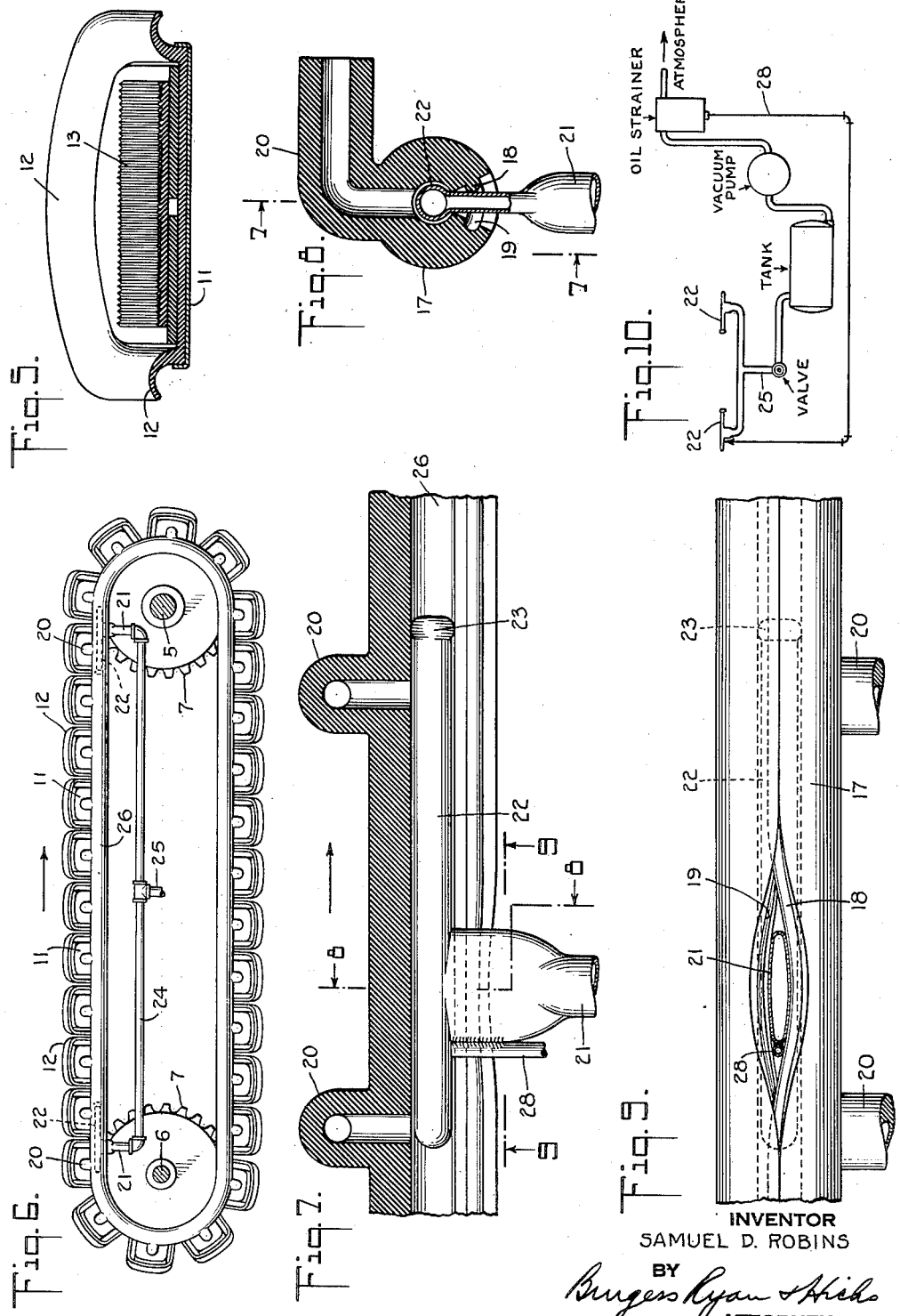
INVENTOR
SAMUEL D. ROBINS
BY
ATTORNEYS

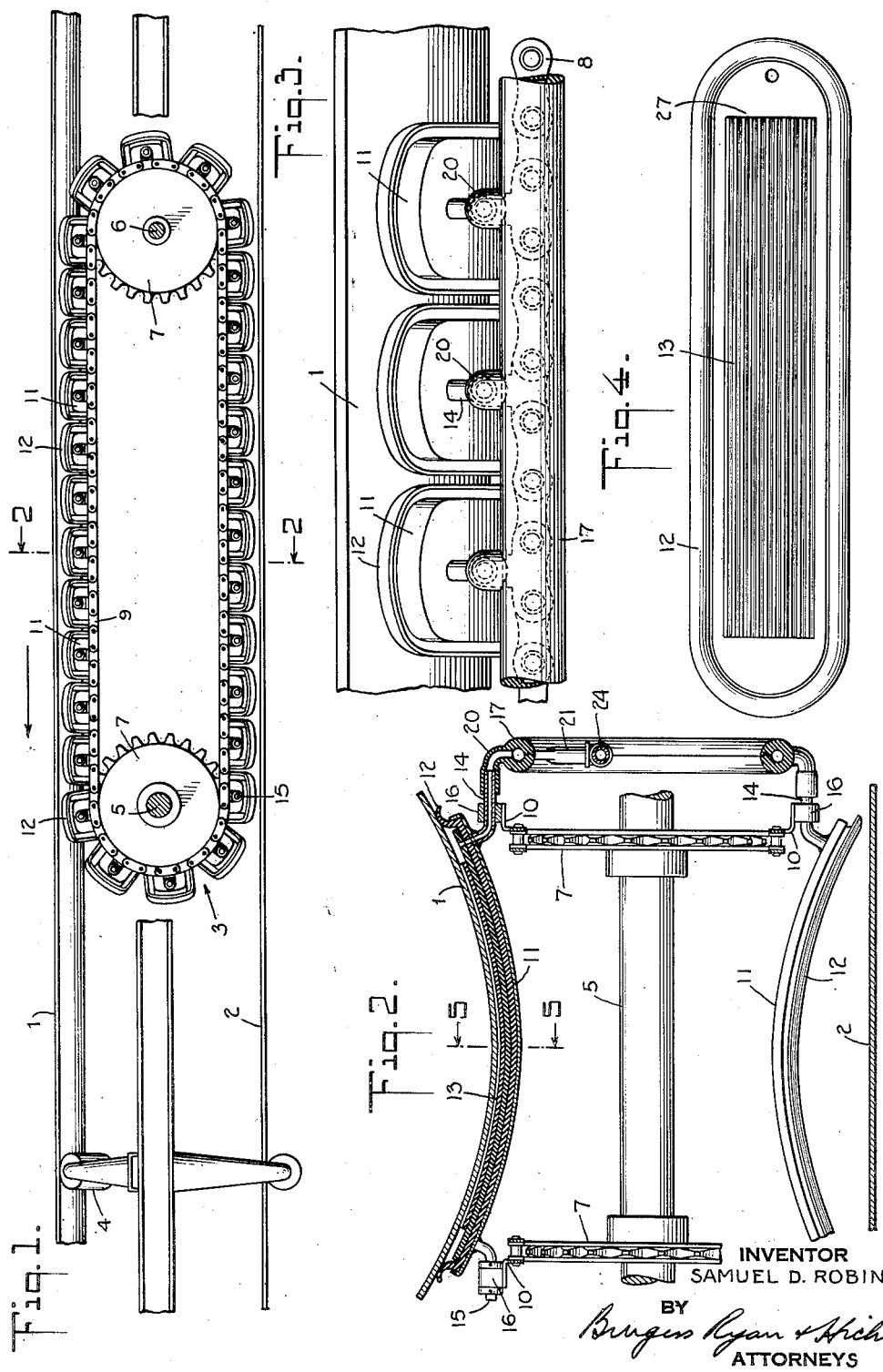

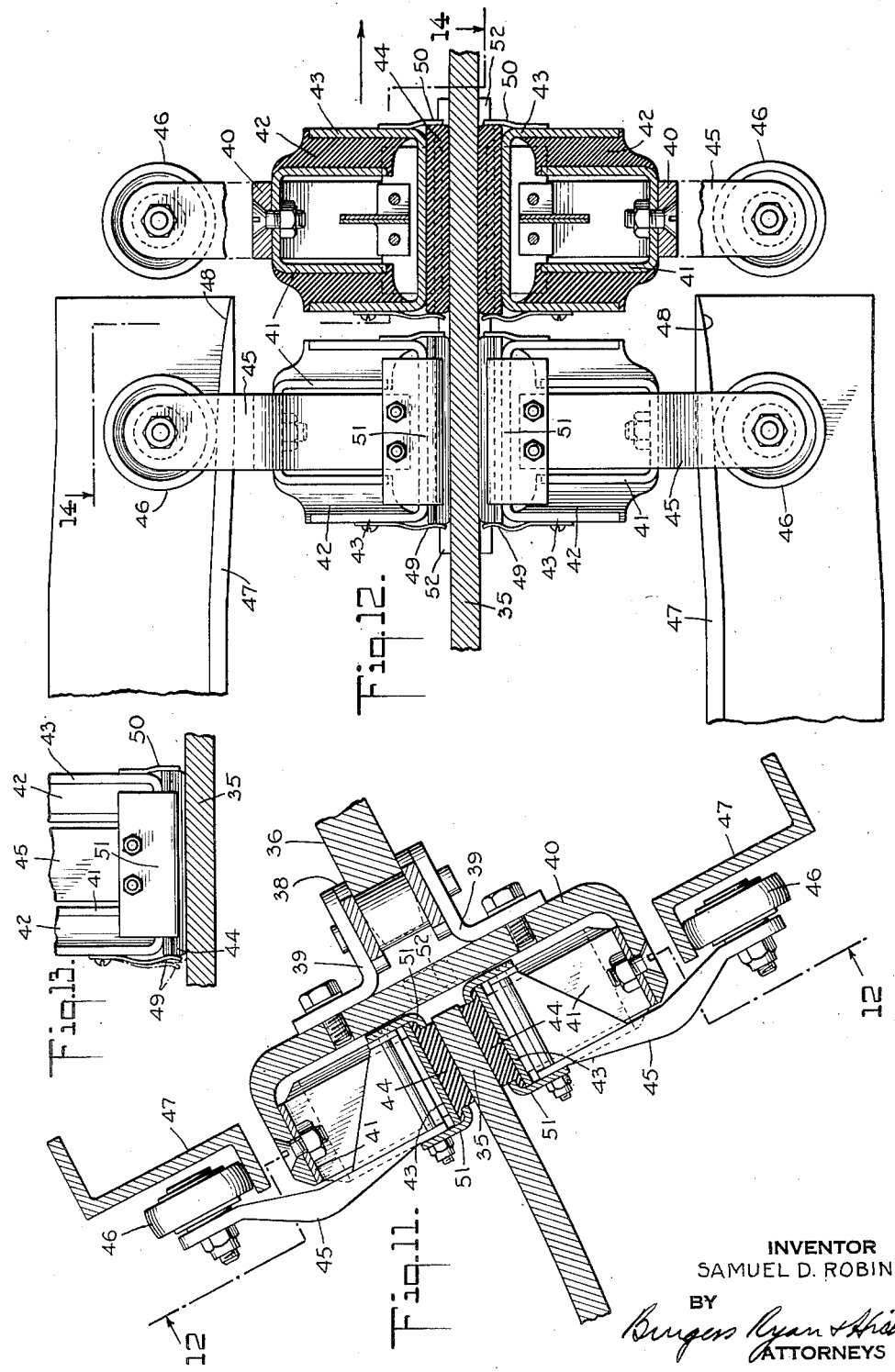

Sept. 1, 1953  S. D. ROBINS  2,650,695
BELT CONVEYER DRIVE

Filed Feb. 11, 1950  6 Sheets-Sheet 4

INVENTOR
SAMUEL D. ROBINS
BY
*Burgess Ryan & Hicks*
ATTORNEYS

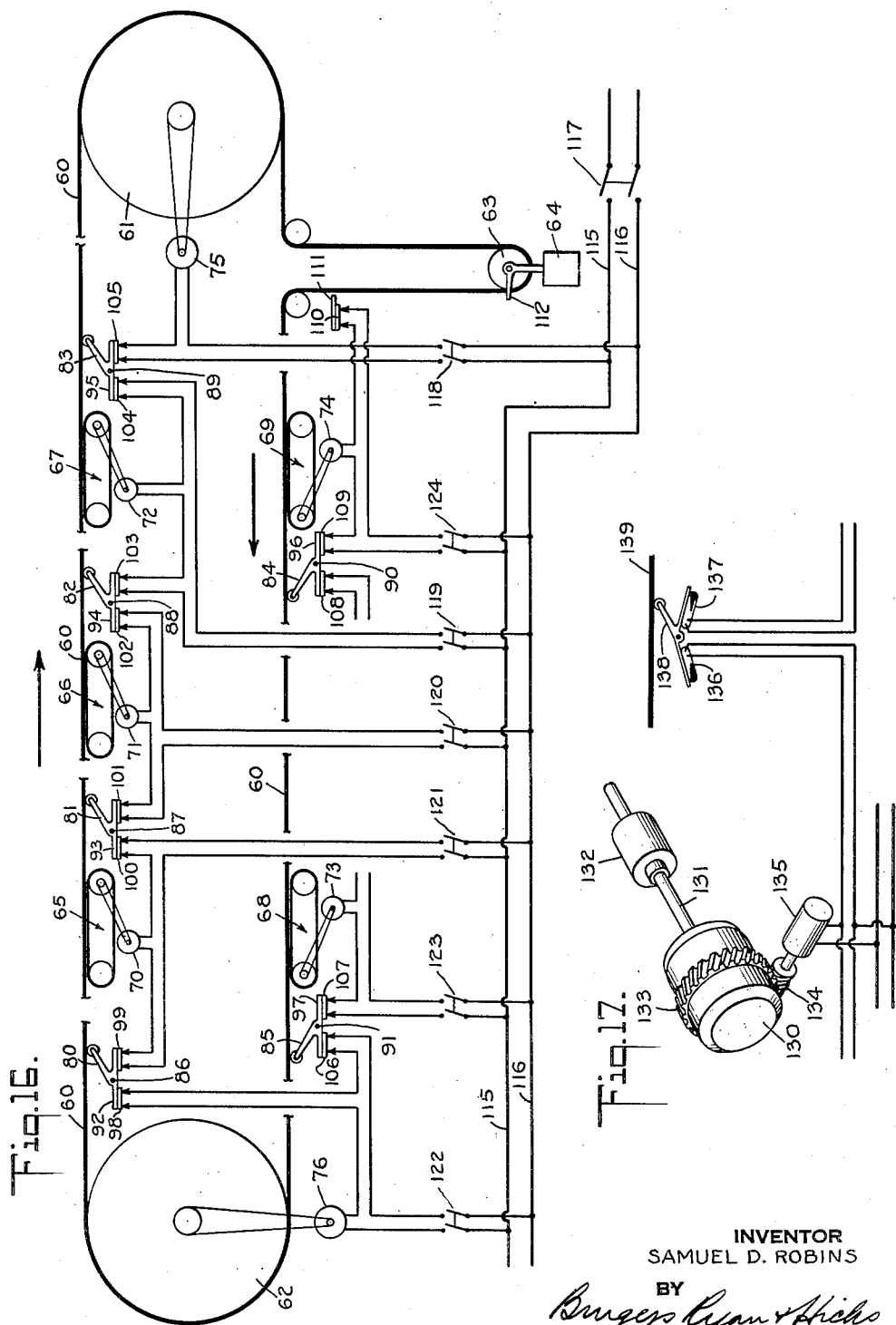

Sept. 1, 1953  S. D. ROBINS  2,650,695
BELT CONVEYER DRIVE
Filed Feb. 11, 1950  6 Sheets-Sheet 6
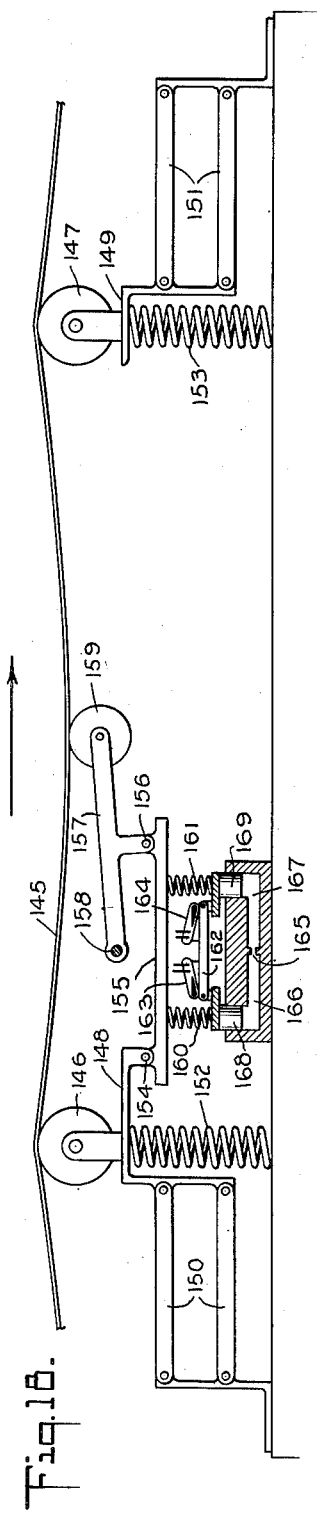
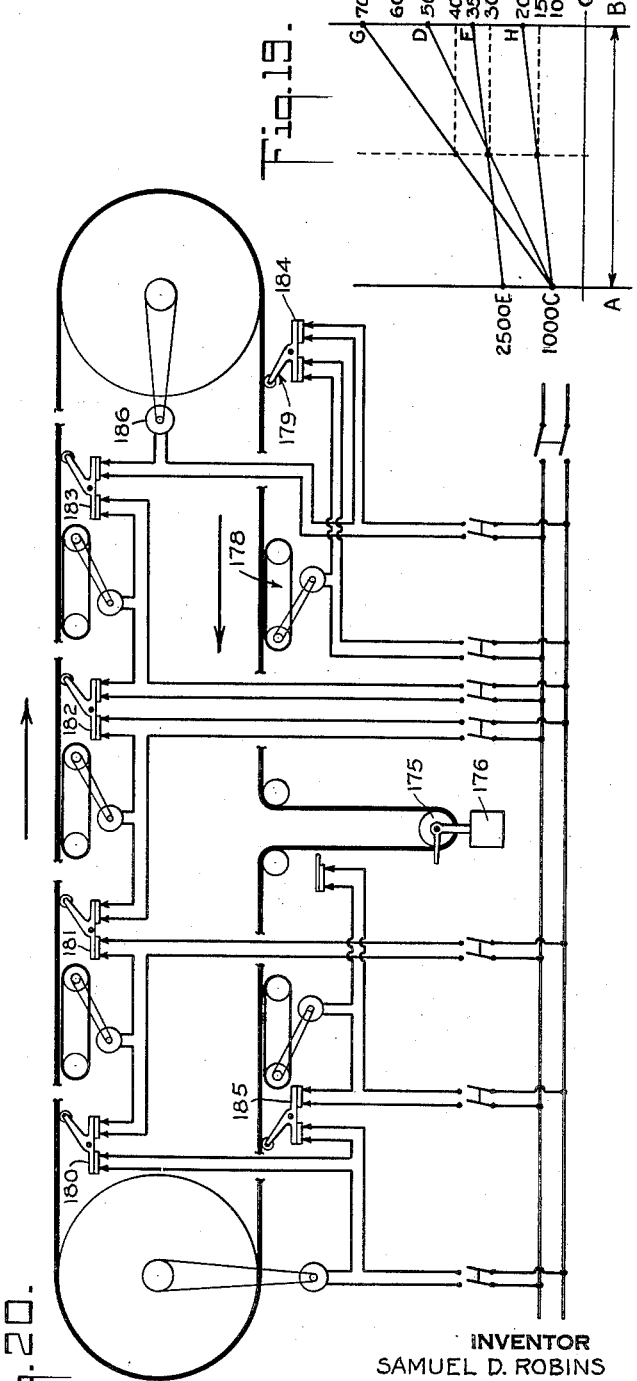
INVENTOR
SAMUEL D. ROBINS
BY
Burgess Ryan & Hicks
ATTORNEYS Patented Sept. 1, 1953

2,650,695

UNITED STATES PATENT OFFICE 2,650,695

BELT CONVEYER DRIVE

Samuel D. Robins, Lawrence, N. Y.

Application February 11, 1950, Serial No. 143,767

8 Claims. (Cl. 198—203)

This is a continuation-in-part of my prior application, Serial No. 97,293, filed June 4, 1949, now abandoned.

In previous installations of belt conveyors for transporting materials over considerable distances or inclines, high tensions which the belts have been required to withstand have led to the fabrication of heavy-duty belts of reinforced construction but, unavoidably, of such high cost as to militate against their more general use. Furthermore, and regardless of belt cost, the length of any belt, reinforced or otherwise, when driven by the conventional head drive is liimted by the allowable tension at the head pulley. Even for level runs, this limitation holds the use of conventionally driven belts to lengths no more than a fraction of those permissible in accordance with the present invention. On the other hand, the substitution for long, extra-strength belts of a multiplicity of shorter, less expensive belts has not proven satisfactory for a number of reasons, among which may be mentioned the belt wear incident to reloading at junction points and degradation of the material being transported.

These difficulties, which have long been recognized, have been proposed to be met by the method illustrated, for example, in Patent No. 1,313,111, dated August 12, 1919, in which a long conveyor belt is proposed to be driven by means of a number of auxiliary "booster belts" located at points along the main belt, to support and drive it independently at these different points along its line of travel. The theory, of course, was to reduce the tension incident to the driving of the belt solely by the usual head pulley and, hence, permit the use of weaker and less costly belts. However, the limited tractive force of such booster belts and other deficiencies not necessary to be elaborated upon here are such as to render that method of drive inadequate to satisfy the practical conditions encountered in the use of conveyors of great length.

Further problems arise as the result of the elasticity of conveyor belts. In the normal, relatively short run, a simple form of take-up serves to accommodate the variations in belt length as between the no-load and full-load conditions of operation; but since the average stretch of a standard 5-ply, 32-ounce duck belt, under its working tension of 6,000 pounds, is of the order of 1½%, it is found that in a belt of a total length of, say, several miles, sundry novel problems arise having to do not only with the disposition of the surplus length which accrues when the belt is loaded but also with the starting and stopping of the belt under various conditions of load throughout its length and with the avoidance of slack and of excessive tension at intermediate points.

The general object of the present invention is the solution of such problems, to the end of making practical the use of belts of standard, inexpensive construction for endless conveyors of great length. A further object is to reduce the cost of conveyor belts of any length wherein, according to the usual head-pulley drive system, high belt tension would require belt construction of extra tensile strength.

The present invention makes use of what will be referred to as intermediate drive units; which units, while analogous in general purpose to the intended purpose of the above-mentioned booster belts, provide what for present purposes may be termed a positive drive for the conveyor. In combination with intermediate drive units of that general character, the invention further provides interconnected controls so organized as to have the effect of adapting the speed of the various driven sections of the conveyor to the speed of whichever section happens, at any time, to be moving at the slowest speed.

As will appear, the invention also makes feasible the use of what for convenience will be referred to as a pre-tensioned belt, by which is meant a conveyor belt which, even when carrying no load, is under relatively high tension and, hence, substantially stretched.

The present invention makes feasible the use of a "minimum construction" conveyor belt which, as that expression is used herein, means a conveyor belt of such length and construction as to be incapable of operating within its normal working tension limit when driven by a conventional head pulley drive. For maximum economy, such minimum construction belt need be of no greater thickness than necessary to withstand the impact at loading points and otherwise support the load. Also, as will presently be apparent, the positive character of the drive afforded by the preferred forms of drive unit makes it possible to incorporate both up-grade and down-grade sections in a long conveyor run, as well as slight "bends" in a horizontal plane.

Further features of the invention having to do with the drive unit structures and the avoidance of undue wear of the conveyor belt will be referred to hereafter in connection with the specific constructions to be described for purposes of illustrating the principles of the invention.

In the accompanying drawings:

Fig. 1 is a broken-out elevation of a conveyor and a suction cup type of drive unit in accordance with the invention;

Fig. 2 is a vertical section on the line 2—2 of Fig. 1;

Fig. 3 is a broken-out elevation on an enlarged scale of a part of the conveyor belt and its drive as viewed from the opposite side to that exhibited in Fig. 1;

Fig. 4 is a plan view of one of the suction cups or trays;

Fig. 5 is a vertical section of one of the cups or trays viewed as on the line 5—5 of Fig. 2 but with the conveyor belt omitted;

Fig. 6 is an elevation of the drive unit itself viewed from the opposite side of that exhibited in Fig. 1;

Fig. 7 is a vertical section of the suction manifold and associated parts viewed as on the line 7—7 of Fig. 8;

Fig. 8 is a vertical section on the line 8—8 of Fig. 7;

Fig. 9 is a view of the underside of the suction manifold and associated parts shown in Fig. 7, partially sectioned on the line 9—9 of Fig. 7; and Fig. 10 is a diagram illustrating the vacuum pump and lubrication connections;

Fig. 11 is a vertical section through the edge portion of a conveyor belt and through an alternative form of drive unit;

Fig. 12 is a partially-sectioned elevational view on the line 12—12 of Fig. 11;

Fig. 13 is a detail of one of the gripper units of Fig. 12;

Fig. 16 is a schematic illustration of one form of system installation according to the invention;

Fig. 17 is a schematic illustration of a form of control for varying the speed of an intermediate drive unit;

Fig. 18 is a diagrammatic elevational view of a secton of a conveyor belt and, associated with it, a preferred type of sag-responsive control;

Fig. 19 is a tension diagram; and

Fig. 20 is a schematic illustration of a modified form of system installation according to the invention.

Figure 14:
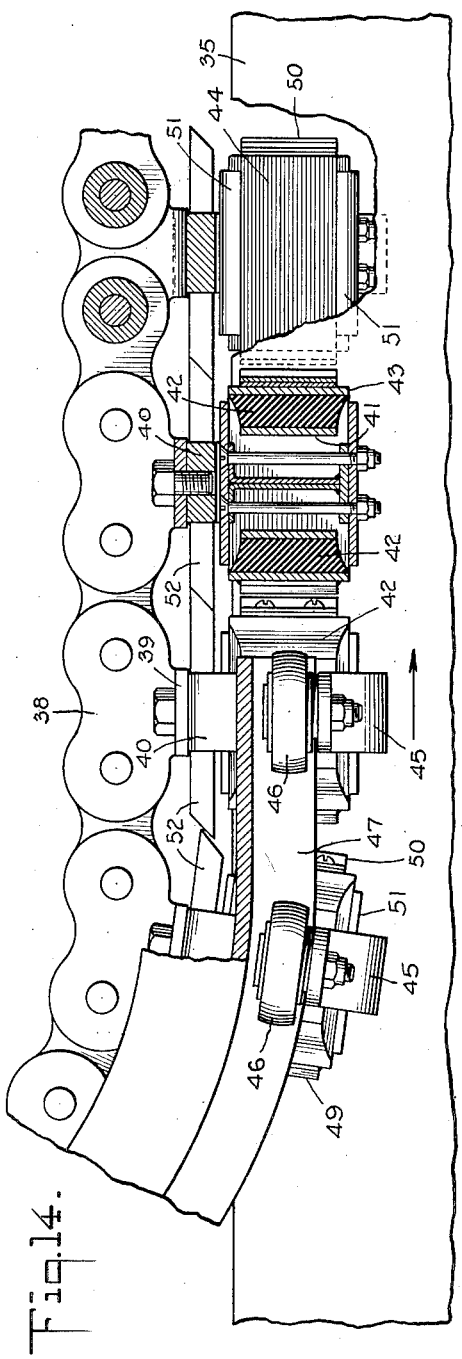
Fig. 14 is a partially-sectioned plan view on the line 14—14 of Fig. 12.

While the specific form of the drive units is subject to wide variation, the preferred forms of the invention contemplate the use of units each of which comprises one or more drive chains (or equivalent endless drivers) which are power operated and which carry what will be referred to as coupling or clamping means for engagement with the conveyor belt. The coupling means serve to interlock the drive chains with the conveyor belt by externally applied pressure, that is to say, without reliance upon mere belt-load friction, as in the case of the booster belts above mentioned; and, in the preferred forms herein illustrated, means are provided for activating and deactivating the coupling or interlocking means, respectively, at the beginning and at the end of that stretch or run of the drive chains which is utilized to effect the driving of the conveyor.

In the form of drive unit first to be described (with reference to Figs. 1 to 10) the interlocking or coupling of the drive units to the conveyor belt is effected by vacuum or suction means.

A portion of the straight run of a conveyor belt 1 is shown, the lower or return run of the belt being marked 2. Between the upper and lower runs of the belt is shown one of the drive units, generally designated 3. The conveyor belt is supported both ahead of and following the drive unit, conventional troughing type idlers being shown for illustrative purposes, of which one set is indicated at 4 (Fig. 1).

In the present, as in the later described form of drive unit, power is conveniently supplied by electric motors, one for each unit, to drive a pair of what will be referred to as endless drive chains, although equivalent belts or the like may be utilized; and, as stated above, the drive chains, in turn, carry the interlocking or coupling means by which the conveyor belt is advanced.

The drive unit illustrated includes a pair of transverse shafts 5, 6 located between the upper and lower runs of the conveyor belt, the shafts carrying sprockets 7 at their opposite ends. The shaft bearings and supporting bed frames, which may be of any appropriate construction, are not shown. Assuming the upper run of the conveyor belt is to be moved from right to left, as indicated by the arrow in Fig. 1, power will be supplied to shaft 5. Endless chains 8, 9, preferably of the roller type, are trained around the sprockets and at suitable intervals, depending upon the pitch of chain used, incorporate so-called attachment links 10, as is common in the construction of pan conveyors and the like. The attachment links of the chains serve to support the vacuum means by which the drive is transmitted from the sprocket-driven chains to the conveyor belt.

In this instance, the vacuum coupling means comprises a series of cups, each of which is arranged to be evacuated substantially throughout its travel in engagement with the adjacent surface of the conveyor belt and to be vented to atmosphere throughout the remainder of its travel. Each cup consists of a metal tray 11 which is curved to conform to the troughed section of the conveyor belt (Fig. 2) and has a surrounding rim 12 of live rubber or the like, to ensure sealing engagement of the tray with the belt. The inner surface of the tray is preferably covered with corrugated, durable rubber 13 (Fig. 4) of the nature of corrugated rubber matting.

The connections between the trays and the drive chains preferably include floating mountings for the trays, so that each is free to accommodate itself to the conveyor belt. As more or less diagrammatically illustrated, trunnions 14, 15 project laterally from the underside of the trays and are journaled in cradle members 16, secured to the attachment links of the respective drive chains. The trunnions serve also as convenient connections for evacuating the tray, although in the present instance only one of them (for each tray) is shown as serving that purpose. In the construction illustrated, trunnion 15 is a stub shaft or pivot, only; whereas trunnion 14 is a tube opening into the interior of the tray.

The number of vacuum cups or trays employed is such that a plurality of them engage the conveyor belt simultaneously at all times and commutating means are employed for applying and relieving the suction in timed relation to the travel of the belt-engaged cups.

In lieu of individual suction pumps, it is preferred to employ a single pump for evacuating all the cups of a drive unit and, accordingly, the outer ends of tubular trunnions 14 are united by a continuous manifold 17 of rubber, neoprene or other suitable material. This manifold is in the form of an endless tube which is split lengthwise, around its inner periphery, the mating edges being appropriately formed, as with a tongue and groove as indicated at 18, 19, respectively, so that in its normal or undistorted form the tube is substantially airtight and, when the air pressure within the tube is less than the exterior pressure, it becomes even more airtight. Elbows 20 formed integrally with the manifold closely embrace trunnions 14 to provide tight connections to the trays. Thus, it will be noted, trunnions 14 serve also as supports for the suction manifold.

In order to establish a suction zone within the manifold to evacuate a number of the cups, on the top stretch of the drive chains, which are in position to engage and drive the conveyor belt, and at the same time avoid applying suction to the remainder of the cups (which are open to atmosphere) two, stationary, suction nozzles are inserted in the split of the manifold. Each of these nozzles consists of a vertical section 21, shaped to minimize spreading of the split of the manifold (Fig. 9), and a horizontal section 22 within the bore of the manifold. Throughout the greater part of their length, the sections 22 are of slightly less diameter than the manifold but at their proximate ends have enlarged heads, as at 23 (Fig. 7) to form a snug sliding fit within the manifold. The vertical sections 21 of the nozzles are connected by pipe 24, from which a single pipe 25 leads to a vacuum pump. Thus, as the drive chain and suction manifold are advanced, the groups of adjacent trays are successively positioned so that their trunnions 14 are coupled to the vacuum zone 26 between the opposed nozzle heads 23. As each trunnion passes beyond the vacuum zone, communication is established with part of the manifold which is open to atmosphere (like all other trays outside the suction zone and out of contact with the conveyor belt) and the affected cup loses its vacuum and its grip on the belt.

Referring to the diagram, Fig. 10, it will be noted that pipe 25, controlled by a suitable valve, is connected to a tank and thence to a vacuum pump. The primary purpose of the tank is to provide additional vacuum capacity in the event of any undue, temporary leak in the system which might otherwise render the pump ineffective to hold any of the cups under adequate vacuum. For example, if a splice or other substantial irregularity in the under-surface of the conveyor belt should happen to be positioned opposite one of the suction trays of the drive unit when the system is at rest, difficulty might be experienced in starting if the resulting leak were sufficient to supply the greater part of or the entire capacity of the pump. Accordingly, a preferred method of starting the drive in operation is to close the valve in pipe 25, start the vacuum pump and evacuate the tank to establish a vacuum of, say, 20 inches; then start the drive unit motor and coincidently, or shortly thereafter, open the valve in pipe 25. By reason of the additional vacuum capacity afforded by the tank, the conveyor belt will be drawn into firm engagement with the drive trays and the belt started in motion. As will be understoood, the "leak" is soon passed along to a point beyond the drive unit and, thereafter, its passage over the described or any other drive unit or units in the system is of such short duration as to have no material effect.

The tray construction is such that the conveyor belt is brought into firm contact not only with the rim 12 but also with the surface material 13, the grooves or valleys in surface material 13 being constantly subjected to the suction of the pump and the conveyor belt held securely throughout the entire area of contact of the tray with the belt. The tray surface which, as above stated, is preferably of rubber, and being corrugated transversely of the conveyor belt, forms an effective driving medium.

In view of the sliding or rubbing contact between the nozzle heads 23 and the wall of the vacuum manifold, some degree of lubrication is desirable in order to minimize wear. For this purpose, a gravity feed lubrication system is indicated in the diagram, Fig. 10. The elevated receptacle marked "oil strainer" is a combined strainer and reservoir and from it the feed line 28 passes the lubricant to the interior of the vacuum manifold alongside one of the vacuum nozzles, as shown in Fig. 7. Oil (or other appropriate lubricant) withdrawn by the vacuum pump is discharged back into the oil strainer. As a protection to the pump, a dirt filter may be inserted on the line on the suction side of the pump or incorporated in the "tank." As will be understood, the type of lubricant employed will depend upon the composition of the suction manifold.

To illustrate briefly the advantages of the above-described type of drive, a comparison of belt requirements may be made with respect to a horizontal conveyor of average width, say 36", and of a length of 3,700 feet, to carry gravel weighing 100 pounds per cubic foot. It will be found that a single conveyor belt driven by the conventional method, that is, by a head pulley, would be required to withstand a pull of 18,000 pounds. To meet that requirement, it would be necessary to employ a 10-ply, 50-pound, cord belt, or equivalent. By contrast, intermedate drive units of the character described permit the use of a minimum construction belt of 5-ply, 32-ounce duck, having a working tensile capacity of no more than 6,000 pounds. The cost of such a belt is less than one-half the cost of the belt for the standard or conventional method of drive, above mentioned.

While the details of construction and arrangement of the described drive of this invention are obviously subject to wide variation and the dimensions of the components a matter of calculation to meet the requirements of any particular installation, the following illustrative statistics may be noted with reference to the type of vacuum tray illustrated.

In the case of the 36" conveyor above mentioned, each tray may be of a width of 6" (lengthwise of the conveyor belt) and of a length of 30" (widthwise of the conveyor belt). While in practice a vacuum of 28" of mercury is readily obtainable, a vacuum of 20" or 10 pounds per square inch may be assumed as a safer working figure; and, on that basis, the 180 square inches of each tray will maintain 1,800 pounds pressure against the driven belt. A working coefficient of friction of .6, minimum, between the corrugated tray surface and the belt has been found to exist, wet or dry; and, accordingly, each tray can be relied upon to develop a tractive pull of 936 pounds or 10,800 pounds for ten trays in working engagement with the conveyor belt.

The alternative form of drive unit illustrated in Figs. 11 to 15 will now be described.

As before, endless drive chains or equivalent belts are utilized to transmit the drive from a motor, to the conveyor belt, through interlocking means carried by the chains; and means are similarly provided for activating and deactivating the interlocking means at the beginning and at the end, respectively, of the limited length of the conveyor belt on which the drive unit operates. In this form, however, the belt-gripping means by which the drive unit is coupled to and uncoupled from the conveyor are controlled mechanically, rather than pneumatically.

In this instance, the drive unit chains operate in the plane of the edge portion 35 of the conveyor belt, being trained around sprockets 36, 37 of which sprocket 37 is motor driven. As will be understood, an identical sprocket-chain assembly is mounted adjacent the opposite edge portion of the belt and the following description of one such assembly will serve for both.

Supported from links of chain 38 by brackets 39 is a yoke 40 to each overhanging arm of which is affixed an inwardly projecting yoke 41; and bonded to the outer faces of the yokes are rubber pads 42 which, in turn, are bonded to the inner faces of shoe frames 43. Associated with the latter are shoes 44 which engage opposite faces of the edge portion of the conveyor belt. The rubber pads 42 are so deformed as to exert a substantial belt-gripping pressure to the shoes 44, say of the order of 100 pounds per square inch. Thus, the drive of chain 38 (and its counterpart on the opposite side) is transmitted through the shoes to the belt.

Secured to each shoe frame 43 is a control arm 45 on the free end of which is mounted a roller 46; and adjacent the ends of that portion of the conveyor on which the drive unit operates are rails 47 having cambered end portions 48 (Fig. 12) and so spaced from the conveyor as to spread the shoe frames to an extent sufficient to relieve the clamping pressure of shoes 44 and to allow such pressure to be reasserted at appropriate times. Thus, at the "entering" or left-hand end of chain 38, as viewed in Fig. 15, the shoe frames are spread as the clamps approach the edge of the conveyor, are held in that position temporarily, and are released (by the rollers leaving the track) just after the path of movement of the clamps has come into conicidence with that of the conveyor. At the "exit" or right-hand end, as viewed in Fig. 15, the rollers engage the track and the clamping pressure is relieved just before the path of movement of the clamps starts to depart from that of the conveyor and continues to be so relieved at least until the clamps are clear of the edge of the belt.

It has been found that there is a certain amount of creep in the conveyor and for that reason provision is made to minimize wear on the belt as the result of any rubbing by the shoes. One way of achieving that result is to mount the shoes with freedom for limited bodily movement in relation to the shoe frames. As illustrated in Figs. 12 and 13, the shoes are mounted with limited freedom to move with the belt, being restrained against forward movement (that is, to the right in Figs. 12 and 13) by fixed stops 50. The shoes are biased toward their forward position as shown in Fig. 13 by fingers 49 which are resilient or spring sustained and which yield to permit the shoes to move backward under the influence of the belt creep, to positions such as are indicated in dotted lines in Fig. 13. When the clamping pressure is relieved as above described, the shoes are, of course, returned to their forward positions by fingers 49. As shown in Fig. 11, the shoes are confined to a fore-and-aft movement by the overhanging brackets 51.

There being a tendency for the clamp units and their chain units to be rocked by the drag of the conveyor belt, means are provided for keeping them in alignment. As shown in Fig. 14, such means comprises a cross-bar 52 affixed to and projecting from each side of each yoke 40 and having its ends bevelled so as to mate with the adjacent ends of its neighboring cross-bars. As will be understood, the adjacent ends of any two cross-bars tend to move in opposite directions, namely, toward one another and, by their appropriately directed bevels, prevent any such movement.

While the material of the shoes is not critical, it is presently preferred to use something of the nature of brake lining strips, so that a high coefficient of friction exists between the shoes and the belt, and effective traction can be secured while holding the total area of contact of the shoes to a reasonable minimum without resort to excessive clamping pressures. The higher coefficient of friction between the shoe and belt than between the shoe and its steel frame assures no slipping on the belt.

Figure 15:
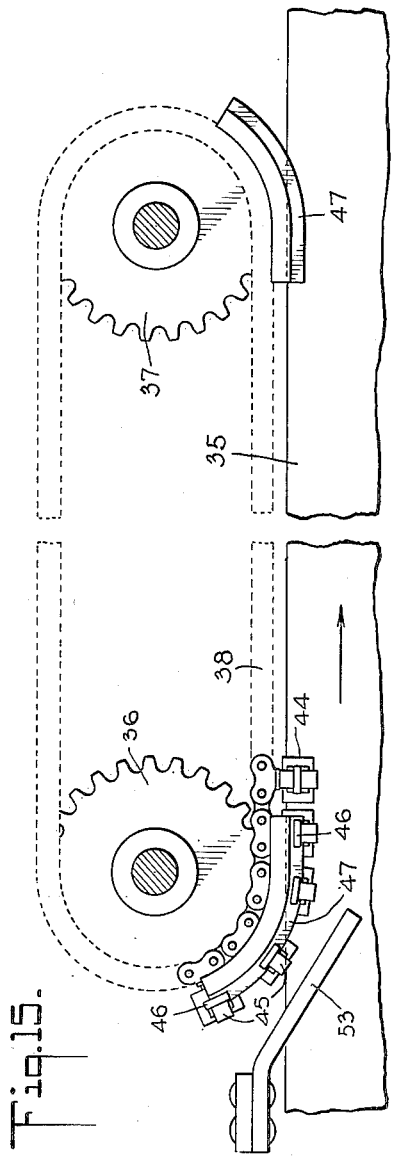
Fig. 15 is a reduced-scale, broken-out diagram, in plan, of the alternative form of drive unit.

At 53, in Fig. 15, is indicated a stationary scraper which, bearing lightly on the belt serves to clean the belt edge and direct toward the center of the conveyor any adhering material which might interfere with the direct clamping of the conveyor by the shoes.

As in the case of the drive units themselves, the whole conveyor system of the invention is susceptible of embodiment in numerous forms but its principles will be understood from the exemplifications now to be described and first with reference to the schematic layout of Fig. 16.

In that diagram, the conveyor belt 60 may be assumed to be several miles in length and, as indicated, trained over a head pulley 61 and a tail pulley 62. At an appropriate point in the return run, one or more take-ups may be provided, power-operated or otherwise, but here indicated conventionally as a constant-tension take-up, consisting of a pulley 63 having a depending weight 64, located at the beginning of the return run adjacent the head pulley.

Intermediate the head and tail pulleys, the upper run of the conveyor is driven by spaced drive units of which three (marked 65, 66, 67) are indicated. The lower run is similarly driven by spaced drive units of which two (marked 68, 69) are indicated. It will be understood that if, as is usually the case, the return run of the belt is not used for transporting any load, the drive units for the return run may be very much more widely spaced than those for the load-carrying upper run. The various drive units are operated by motors 70, 71, 72, 73 and 74 and the head and tail pulleys are also driven, as by motors 75, 76, respectively. As will be understood, the drive motors are adequate to provide the required total horsepower pull for the particular system and the spacing of the drive units from each other and from the head and tail pulleys is such that, during normal running, the sections of the conveyor belt between driving points are operated without exceeding the normal working tension prescribed for the particular minimum belt construction.

However, due to a number of variable factors encountered in actual practice (such as unavoidable variations in belt loading, elasticity of the belt, minor variations in the structure and operation of the assumed identical components of the system), the hazard arises of slack developing ahead of, that is, on the downstream or delivery side of any one or more of the drive points (except the head pulley). For example, interruptions of the feed of material to the conveyor may result, at any given time, in each of one or more of the drive units hauling a fully loaded stretch of belt and each of one or more other drive units hauling an empty stretch of belt. Some stretches may be partially loaded and, of course, such a varying load pattern itself varies as the conveyor advances. In starting and stopping the system, these same variables are encountered. As will be understood, any undue accumulation of slack in the upper run of the conveyor results in spillage of the material being conveyed and must be avoided. And, in addition to the hazard of slack or undertension developing at certain points in the system, there is found to be the corelative hazard of overtension developing at other points.

While the use of synchronous motors for all drives might be assumed to meet these difficulties, they are found only to minimize and not to eliminate them in most instances, due to the difficulty of ensuring the same traction at each drive point, particularly when a substantial number of drive units is required to be used. Furthermore, of course, the high cost of such motors would militate against their use in substantial numbers, even if otherwise satisfactory. When (as their reasonable cost dictates) induction motors are used, the so-called slip or difference between their full-load and no-load speeds, amounting to some 3%, may be responsible for under or overtension developing rapidly under the varying conditions referred to above.

It has been found that these difficulties can be met by providing each drive motor with what will be referred to broadly as a sag-responsive control and by interlocking all of these controls in such fashion that the speed of each driven section of the conveyor belt is, in effect, determined by the speed of that section which, at any time and for any reason, happens to be advancing at the slowest speed.

In general, each sag-responsive control preferably comprises a feeler member applied to the underside of the conveyor belt and mounted for upward movement as the belt sag decreases and for downward movement as the belt sag increases. The feeler members are arranged to control the circuit of the immediately preceding (upstream) and of the immediately following (downstream) drive motors. The arrangement is such that in response to abnormal, that is, excess sag, the feeler operates to retard the preceding (upstream) drive; and, in response to sub-normal sag, the feeler operates to retard the following (downstream) drive. The word "retard" is used broadly herein to include the extreme case of reducing a drive speed to zero.

It will also be understood, of course, that the systems to be described herein are assumed to be equipped with appropriate belt-supporting idlers and that their spacing, as is conventionally the case, is such that there is some amount of belt sag between idlers, even when the belt is running empty.

Reverting now to the Fig. 16 diagram, it is to be noted that this simplified showing is purely schematic (all relays, for example, being omitted) and that it is intended only to exemplify the principles of one form of system incorporating the invention and not to illustrate any of the numerous mechanical, electrical and electro-mechanical expedients available or most desirable for the indicated purposes.

The sag-responsive devices are indicated as feeler arms 80, 81, 82, 83, 84, 85 and these arms are spring or otherwise biased to maintain contact with the underside of the belt, through rollers or the like carried at their upper or free ends. The feeler arms are pivoted at 86, 87, 88, 89, 90, 91. As will be understood from the diagram, the upward and downward movements of the feeler arms rock the cross-bars 92, 93, 94, 95, 96, 97 and thereby control one or the other of two switches, for convenience designated, respectively, an undertension switch and an overtension switch. Thus, when feeler arm 80 moves downward (as the result of abnormal or excessive sag in the belt) it opens undertension switch 98; when it moves upward (as the result of sub-normal sag) it opens overtension switch 99. Switch 98, it will be noted, is in the circuit of tail pulley drive motor 76 and the retarding of the tail pulley drive results in the abnormal sag being taken up by the drive unit 65 on the downstream side of the point to be regulated. As and when the abnormal sag is removed, the feeler again closes switch 98 and the tail pulley drive is resumed. Switch 99, on the other hand, is in the circuit of drive motor 70; and when this switch is opened as the result of subnormal sag adjacent the tail pulley, drive unit 65 is retarded, its normal running being resumed when the overtension condition has been corrected.

Without describing these identical functions as performed by all of the other feelers, it will be sufficient to note generally that each drive motor (excepting only that of the head pulley) is controlled by similar overtension and undertension switches, each one of which serves to retard a drive motor in response to a sag condition in a particular section of the conveyor belt which requires correction. However, while the undertension switch at a feeler station controls the drive motor behind or on the upstream side of that station, the overtension switch at that same station controls the drive motor ahead or on the downstream side of the station. In each instance, the operation is as described above with reference to feeler 80 and switches 98, 99. The undertension switches corresponding to switch 98 are marked 100, 102, 104, 107, 109; and the overtension switches corresponding to switch 99 are marked 101, 103, 105, 106, 108.

At the head pulley end of this particular system, no undertension control is required in the initial stretch of the return run (that is, between the head pulley and the take-up) for the obvious reason that the take-up absorbs undue slack in that section. Hence, the head pulley motor 75 is indicated as being automatically controlled only by the overtension switch 105, operated by feeler arm 83 adjacent drive unit 67.

It is also to be noted that a somewhat different switch arrangement is indicated for providing overtension control of drive unit 69. The circuit closer of the overtension switch 110, in this instance, is diagrammatically shown as having a lateral projection 111 positioned for engagement by a switch-opener element 112 projecting laterally from the hub of take-up pulley 63.

The undertension switches also serve an important function in addition to the one already indicated, namely, that of bringing about successive stopping and starting of the various drive motors and thereby minimizing the current surge which would result if all motors were energized simultaneously.

In the simplified two-wire diagram of Fig. 16, the main leads 115, 116 are shown as controlled by a master switch 117; and the leads to the respective drive motors are shown as controlled by individual switches 118, 119, 120, 121, 122, 123, 124. Now, if one of these individual switches is opened, for example switch 118, thereby stopping the head pulley drive motor 75, all the other individual switches remaining closed, it will be apparent that sag will tend to develop on the downstream side of drive unit 67; and that undertension switch 104 will thereupon be opened and stop drive motor 72. Slack will then tend to appear on the downstream side of drive unit 66 (if that be the next unit to the left of unit 67) and its undertension switch 102 will stop its drive motor 71; and so on, back through the system. When the head pulley is thus stopped and drive unit 69 in the lower run continues to operate, an "overtension" condition may be manifested by the rising of the take-up weight 64 to the point opening of switch 110 and stopping motor 74 before the successive opening of the undertension switches can reach undertension switch 109 to stop motor 74. Whether this overtension stopping of unit 69 (and possibly other units to the left of it) does or does not occur is unimportant, depending as it does upon the design characteristics of the particular system. In any event, all of the units will be brought to rest by the response of over or undertension switches, as the case may be. If, in any particular system, more rapid stopping is deemed to be desirable, it can be accomplished by blocking the rise of the take-up at the instant that the switch is thrown to stop the system. This requires adding an overtension feeler and switch between drive unit 69 and the head pulley 61 for stopping drive motor 74.

After the system has thus been brought to rest by that "successive stop" method, it can be restored to running condition by a "successive start" simply by reclosing the head pulley motor switch 118.

It will be noted that all of the overtension switches, both in the upper and in the lower runs of the belt, are available to serve as safety switches to bring drive units to rest in the event of some accident or emergency condition resulting in a complete stoppage of the belt at some point in the system and a resulting tension build up on the downstream side of that point.

In the light of the foregoing description of the principles exemplified in Fig. 16, it will be recognized that those sag tendencies requiring correction which are encountered during normal operation can be remedied by slowing instead of actually stopping the appropriate motors. Thus, the feeler devices can be arranged to close instead of open overtension and undertension switches, the latter serving to energize the circuits of what for convenience will be referred to as retarder motors, appropriately coupled to the unit drives or their motors. Various speed control mechanisms which can be adapted to this purpose are known in other arts. One such arrangement is schematically illustrated in Fig. 17.

In this arrangement, motor 130 (which is representative of all the drive motors of the system) is mounted so that it is bodily rotatable about its shaft axis. Its shaft 131 is assumed to be connected to an intermediate drive unit through a speed reducer 132. A ring worm gear 133 is carried by the motor housing and meshing with such gear is a worm 134 adapted to be driven by a small retarder motor 135. In such arrangement, it is the circuit of the retarder motor rather than the unit drive motor which is controlled by the undertension and overtension switches. The latter are indicated as mercury type switches 136, 137 adapted to be closed in response to the movements of feeler arm 138, engaging the underside of belt 139 and corresponding to the feeler arms 80, etc. already described. Thus, when the feeler arm moves downward in response to abnormal sag, it closes switch 136 and energizes the retarder motor. The latter, rotating the drive motor 130 about the shaft axis, reduces its output speed and slows the drive unit operated by motor 130. As before, such unit would be the one on the upstream side of the point of abnormal sag. When the condition is corrected the feeler breaks the circuit of the retarder motor and the drive motor resumes its normal speed. Similarly, when the feeler arm 138 moves upward in response to subnormal sag, it closes switch 137 and energizes the circuit of a similar retarder motor for the drive motor on the downstream side of the point requiring regulation. The retarder motors are preferably provided with magnetic brakes (not shown).

The retarder motor arrangement just described can readily be modified to provide for actually stopping the unit drive motors in response to some greater degree of abnormal or subnormal sag requiring further protection for the system; as, for example, in the case of belt stoppage resulting from accident. As will be apparent, switches operating on the principle exemplified in Fig. 16 but set to operate at wider limits of abnormal and subnormal sag can be added to the Fig. 17 arrangement, so that the drive unit motors are merely slowed to take care of what may be termed normal sag variations but are stopped in response to that greater degree of sag variation which accompanies such conditions as accidental belt stoppage.

In the foregoing exemplification of the broader principles of the invention it has been unnecessary to differentiate between belt sag variation attributable to variation in the load carried by the belt and sag variation attributable to tension variation. In that connection, however, the invention contemplates a refinement of the sag-responsive controls, as exemplified schematically in Fig. 18.

According to this arrangement a limited stretch of each driven belt section (that is, of each length of the conveyor belt between drive points) is provided with resilient or floating supports, so that such stretch of the belt is free to move up and down in accordance with the load it is carrying. The belt feelers are so mounted that they, too, rise and fall as the belt loading varies and to such an extent as, in effect, to offset the belt sag variations attributable to differences in the load carried by the belt. In short, the sag-responsive controls, while still sensitive to sag variation, are rendered sensitive only to such sag variation as is the result of an actual change in belt tension.

By incorporating in the system sag-responsive devices of this character (for convenience referred to as "weight-compensated"), the system lends itself to control in various ways not otherwise attainable. As will later be apparent, it becomes possible to establish and maintain a predetermined belt tension at the point of application of the feeler, regardless of the load carried on the belt; or, by another modification, to establish different tensions at that point for different load carrying conditions of the belt.

Referring to Fig. 18, a portion of a conveyor belt 145 is shown passing over successive idlers 146, 147. These idlers are supported on frame members 148, 149 which are in turn connected by parallel motion links 150, 151 to suitable fixed supports. The links, frame members and idlers are supported by springs 152, 153.

The frame member 148 is pivotally connected at 154 to one end of a beam 155, the other end of which is pivotally connected at 156 to an intermediate point in the length of feeler arm 157. The latter is mounted on a fixed pivot at 158 and at its free end carries a feeler roller 159 which engages the underside of the belt 145 midway between the idlers 146, 147. The beam 155 is sustained and contact between the feeler roller and the belt is maintained by light springs 160, 161. A second beam 162 is shown as carrying two switches 163, 164 (which correspond to the undertension and overtension switches 98, 99, etc. of Fig. 16 or 136, 137 of Fig. 17). Preferably, a damper is provided to reduce the sensitivity of switch beam 162. Schematically, the damper action is shown as effected by a restricted and preferably adjustable orifice 165 connecting fluid chambers 166, 167 in the vertical branches of which are mounted pistons 168, 169 which support the switch beam. As indicated, springs 160, 161 seat on the tops of the pistons.

When the belt is running empty, the idlers 146, 147, supported by idler springs 152, 153, will be in their upper positions; and any belt tension variation which is reflected in a sag variation from the normal for which the feeler mechanism is set, will cause the belt feeler to move up or down about its pivot 158, rock beam 155 about pivot 154 and, through springs 160, 161 and pistons 168, 169, rock the switch beam 162 and operate one or the other of switches 163, 164. As in the previously described arrangements, switch 163 can be assumed to be an undertension switch (controlling the motor of the drive unit on the upstream side of the feeler) and switch 164 can be assumed to be an overtension switch (controlling the motor of the drive unit on the downstream side of the feeler).

When the belt is running loaded, the idler spring 152 is compressed and, through frame member 148, left-hand end of beam 155 is depressed. Also, feeler roller 159 is depressed by the increased sag incident to the load which the belt is now carrying; and, through feeler arm 157 and pivot connection 156, the right-hand end of beam 155, is depressed. Again, however, under the loaded belt condition just assumed, any belt tension variation which is reflected in sag variation from the new, normal position of the feeler, will cause the latter to move up or down about pivot 154 and operate one or the other of switches 163, 164. The same action occurs under any intermediate, partial load condition of the belt. It is to be noted that the connection between the right-hand end of beam 155 and the feeler roller is such as to multiply or enlarge the vertical motion of the roller as compared to the vertical motion of pivot connection 156. According to the tension or tensions desired to be maintained, a parallel motion is imparted to the beam 155 even though the idler roller and feeler roller travel different distances. The pivot 156, in order to maintain beam 155 in its horizontal position during changes in the load carried by the belt, of necessity rises and falls to the same extent as idler 146; whereas the feeler roller must rise and fall to a different extent.

As will be understood, idler 147 will also move up or down as the load carried by the belt varies and it is preferred to so provide in order to maintain the natural catenary curve of the portion of the belt between the idlers. In this connection, it will be appreciated that even though idler 146 feels a belt load change before idler 147, the combination of the factors of speed of the belt and the relatively short distance between the idlers (a matter of a few feet) plus the damper action, results in the feeler mechanism responding as if the belt and both idlers rose and fell simultaneously.

As will be apparent, the character of the resulting tension control is predetermined by appropriately establishing the relative rates of movement of the feeler roller and the belt supporting idlers (determined by the idler spring rate and the motion-multiplying linkage).

By using simple uniform rate springs 152, 153 of the character illustrated, a predetermined belt tension can be maintained at the point of application of the feeler; or by modifying the spring rates or linkage, or both, different tensions for different belt loads can be established, whereby it becomes possible to lock into the working run of the conveyor belt such a degree of pre-tensioning as to permit the elimination of a very great part of the otherwise large capacity required of the take-up.

Referring to the tension diagram Fig. 19 and taking round numbers for convenience of illustration, let it be assumed that AB represents a distance of 1000 feet between drive units and that the particular belt under consideration is designed for a normal working tension of 5000 lbs.; also that the empty belt resistance is 1000 lbs. per 1000 feet and the loaded belt resistance is 4000 lbs. per 1000 feet. The tension distribution in this stretch of the belt under full load running conditions (the belt moving from left to right) is then represented by the line CD, varying from 1000 lbs. minimum to 5000 lbs. maximum, establishing a mean of 3000 lbs. If, now, this same mean be established for the empty belt tension, it follows that, with no change of mean tension, there will be no change of length of the section of belt under consideration, whether it be running loaded or empty. As will be recognized, the line EF represents the tension distribution required for the empty belt for that purpose, viz., a mean tension of 3000 lbs. and a difference of 1000 lbs. between the tensions at the beginning and at the end of the belt section; or, specifically, a tension of 2500 lbs. at the beginning and a tension of 3500 lbs. at the end of the section. Thus, while the tension at A for the loaded belt is 1000 lbs., the tension at A for the empty belt is 2500 lbs.

It will be apparent that such conditions can be established by means of a tension control located just downstream from a drive unit and in which, for example, the idler supporting springs 152, 153 are of a volute or other variable rate type to accord with the requirements of the particular system. For convenience, the expression "differential weight-compensated controls" will be used to identify the weight-compensated controls incorporating variable rate springs or equivalent linkage.

Referring again to the diagram Fig. 19, a somewhat different but temporary condition exists on starting up the system. Assuming the drive motor of the unit at B to have a starting torque of 150%, the tension in the belt at the right-hand end of the section will be 1000 lbs. plus 150% of 4000 lbs. or a total of 7000 lbs., the line CG representing the tension distribution. The mean tension, under this starting condition, will be not 3000 lbs., as during normal running, but 4000 lbs.; which means, of course, that the section of the belt will theoretically stretch to an extent commensurate with that additional mean tension of 1000 lbs. The amount of "surplus" belt will be absorbed by the take-up.

As indicating the saving in take-up capacity thus brought about, it is to be noted that in the case of the straight weight-compensated control (that is, not differential) when likewise located just downstream from a drive unit, the tension diagram for the empty belt is represented by the line CH; that is, rising from 1000 lbs. to 2000 lbs., or a mean of only 1500 lbs. Under that condition, the take-up is required to be of a capacity to absorb not only the elongation incident to the greater mean incident to starting, as above mentioned, but also an elongation commensurate with the difference between the empty belt mean tension of 1500 lbs. and the loaded belt mean tension of 3000 lbs., or 1500 lbs.; in other words, a total of 2500 as against a theoretical maximum of 1000 for the locked-in tension system. The theoretical saving in favor of the latter is thus 60%; or, in other words, the take-up capacity required for the system employing differential weight-compensated controls is no more than a theoretical 40% of that otherwise required. These figures are referred to as "theoretical" because in practical effect, the longer the conveyor the greater the saving. This result stems from the fact that the stretching of the belt, incident to starting, is temporary and is followed by a corresponding relaxing or shortening; and while at the head drive end of the system the full starting surplus of the adjacent driven section of the belt may be advanced into the take-up, the alternately stretching and relaxing driven sections of the belt remote from the head pulley effect somewhat of an interchange between themselves with the result that much of the theoretical starting surplus never does reach the take-up.

Fig. 20 illustrates another of the various types of system in which the invention may be embodied. In general, it will be seen to be patterned after the schematic showing of Fig. 16 and hence need not be described in detail. In this arrangement, the take-up (represented by pulley 175 and its weight 176) is re-located, there being a drive unit 178 between the take-up and the head pulley. As before, each drive point, except the one to the right of the take-up is followed (on the downstream side) by feeler and over-tension and undertension switches, the head pulley now having a feeler mechanism 179 on its downstream side. As before, the switches operate to retard the respective drive motors in response to under or overtension conditions.

In this embodiment of the system, the drive motor of unit 178 is continuously operated at a slightly reduced speed, say, of the order of 95.5% of synchronous speed. In the result, all the other drive motors, in varying degree, tend to feed slack into the belt on the donwstream side of the units or pulleys which they drive. Thus, during normal operation, the function of controlling the belt is deliberately thrown on the undertension switches (180, 181, 182, 183, 184, 185) each of which operates to retard the drive motor on the upstream side of its feeler arm, as previously described. The overtension switches are in the nature of safety or emergency switches. As will be apparent, they will be called upon to operate only in the event of actual stoppage of the belt at some point in the system.

Instead of using the motor of drive unit 178 as the reduced-speed control motor for the entire system, one of the other motors may be used as what can be called the standardizer. For instance, the head drive motor 186 might be utilized. In this instance, however (and the same would be true when using any motor of the system which is subject to varying load), a synchronous motor should be used and an appropriate speed reducing mechanism incorporated in its drive to the head pulley, or other drive unit as the case may be, for the purpose of establishing the required constant speed slightly below that at which any of the other motors in the system are likely to operate during normal running. When thus using a synchronous motor as a standardizer for the system, the take-up (if any) can be located at whatever point in the lower run of the belt is most convenient.

It will be apparent that the principles of the invention lend themselves to embodiment in numerous forms and adaptations according to preference or the conditions required to be satisfied in any particular installation; and, accordingly, the examples given will be understood to be illustrative only. For instance, instead of "retarder" motors, "accelerator" motors, sufficiently large to add power at each station, and thereby speed up any drive desired, can be correlated by similar overtension and undertension controls to bring all drives to a standard highest loaded speed, rather than to the lowest loaded speed as above described. Also, depending upon the particular conditions, the sag-responsive control arrangement is flexible, both as regards the number employed and their location.

Throughout the foregoing, the description has been largely confined to horizontal conveyor systems, the drive units acting as drivers in the sense of putting power into the belt at all stations. Equally, if not more important, are the applications of the invention to inclined conveyors such as are used for elevating or lowering the material to be conveyed. In the case of long uphill conveyors, the downhill pull of the return belt may develop high tension requiring so-called "drives" to be utilized at spaced intervals to limit the tension to the allowable value of the "minimum belt"; but in such cases these drives actually take power from the belt rather than put it in. Similarly, in the case of downwardly inclined conveyors, the upper run "drives" may require braking control. It is within the contemplation of the invention to apply the system of controls described above to the speed regulation of such drives, whether functioning in the power input or power absorption sense; that is, to use regenerative or dynamic braking, which are well-known expedients.

In the light of the foregoing, the following is claimed:

1. The combination of a conveyor belt of minimum construction trained over head and tail pulleys; an intermediate drive unit having belt drive means engaging a limited stretch of the load carrying run of the conveyor belt intermediate the head and tail pulleys; sag-responsive means associated with the belt on the downstream side of the intermediate drive unit; idler means for supporting a portion of the belt on the downstream side of the drive unit; resilient means for supporting said idler means and said sag-responsive means and permitting both to rise and fall conjointly under varying load carried by said portion of the belt; motion-multiplying linkage for accelerating the rate of movement of the sag-responsive means in relation to that of the idler means; a motor for driving the head pulley; a motor for driving the intermediate drive unit; and circuit means actuated by movement of said sag-responsive means independently of said idler means, including means for retarding the drive unit motor in response to abnormal belt sag at any of the positions conjointly assumed by said sag-responsive means and said idler means.

2. Conveyor belt tension control means comprising: a vertically movable conveyor belt idler; a resilient support therefor; a switch actuator mounted with freedom for bodily movement and pivotal movement; a switch arranged for actuation by pivotal movement of said actuator; connections between the idler support and one portion of the switch actuator; a vertically movable belt feeler member; and lever connections between the belt feeler member and another portion of the switch actuator, said two connections imparting bodily or pivotal movement to said actuator according to the relative rates of movement of the belt idler and feeler member.

3. In a conveyor of the kind including an endless belt having a continuous load supporting surface extendng between head and tail pulleys and having more than one drive means for the belt, one of the said drives being located at a point in the working run intermediate the head and tail pulleys: belt tension feeler means adapted to respond to belt tension variation independently of the variation of the weight of material supported by the belt; control means for at least one of the drive means actuated by said feeler means; the working run of the belt engaged by the feeler means being stretched beyond its relaxed length to an extent such as to subject it, when running empty, to a mean tension approximately equal to the mean tension of the working run when it is being driven under normal working load, whereby the length of belt between drives is maintained constant.

4. The arrangement set forth in claim 3 in which the said feeler means is located intermediate two drive means substantially at a point in the length of belt between the drive means where the mean tension of such length of the belt when running empty equals the mean tension of such length of the belt when running loaded.

5. In a conveyor, the combination of: a conveyor belt of minimum construction; drive chains located adjacent opposite edge portions of a limited length of the belt; gripper means carried by the chain in driving engagement with the upper and lower surfaces of edge portions of said limited length of the belt; means for driving said chains; the gripper means including friction member frames and belt-engaging friction members mounted with freedom for limited bodily movement relative to the said frames lengthwise of the belt, whereby to compensate for the unit change in length of the belt as it is advanced by the gripper means.

6. In a conveyor, the combination of: a conveyor belt drive means adjacent edge portions of the belt; gripper means carried by said drive means in driving engagement with said edge portions, the gripper means including friction means frames and belt-engaging friction means mounted with freedom for limited bodily movement relative to the said frames lengthwise of the belt, whereby to compensate for the unit change in length of the belt as it is advanced by the gripper means.

7. In a conveyor, the combination of: a conveyor belt; drive means adjacent edge portions of the belt; gripper means carried by said drive means and overlying said edge portions, the gripper means including friction means frames and belt-engaging friction means mounted with freedom for limited bodily movement relative to the said frames lengthwise of the belt, whereby to compensate for the unit change in length of the belt as it is advanced by the gripper means; the coefficient of friction between the friction means and the said frames being less than the coefficient of friction between the friction means and the belt.

8. In a conveyor, the combination of: a conveyor belt; drive means adjacent edge portions of the belt; gripper means carried by said drive means and overlying said edge portions, the gripper means including friction means frames and belt-engaging friction means mounted with freedom for limited bodily movement relative to the said frames lengthwise of the belt, whereby to compensate for the unit change in length of the belt as it is advanced by the gripper means; the coefficient of friction between the friction means and the said frames being less than the coefficient of friction between the friction means and the belt; and spring means associated with said friction means and biased to oppose said relaitve movement.

SAMUEL D. ROBINS.

References Cited in the file of this patent

UNITED STATES PATENTS

| Number | Name | Date |
|---|---|---|
| 804,474 | Hoy | Nov. 14, 1905 |
| 1,260,308 | Brockenbrough | Mar. 26, 1918 |
| 1,370,029 | Macdermid | Mar. 1, 1921 |
| 1,497,619 | Waechter et al. | June 10, 1924 |
| 1,743,734 | Steele | Jan. 14, 1930 |
| 1,754,089 | France | Apr. 8, 1930 |
| 1,763,735 | Wydom | June 17, 1930 |
| 1,911,961 | Melnick | May 30, 1933 |
| 1,960,719 | Stibbs | May 29, 1934 |
| 2,105,824 | Simonds | Jan. 18, 1938 |
| 2,114,716 | Kunzle | Apr. 19, 1938 |
| 2,128,795 | Bishop | Aug. 30, 1938 |
| 2,130,433 | Webb | Sept. 20, 1938 |
| 2,198,179 | Regan | Apr. 23, 1940 |
| 2,386,558 | Kleintop | Oct. 9, 1945 |
| 2,489,796 | Miller | Nov. 29, 1949 |
| 2,609,085 | Terhune | Sept. 2, 1952 |

FOREIGN PATENTS

| Number | Country | Date |
|---|---|---|
| 428,907 | Germany | Apr. 2, 1925 |